(12) United States Patent
Ma et al.

(10) Patent No.: US 6,844,042 B1
(45) Date of Patent: Jan. 18, 2005

(54) OPTICAL RECORDING MEDIA FOR AIR-INCIDENT OPTICAL RECORDING

(75) Inventors: Guolin Ma, Milpitas, CA (US); Easen Ho, San Jose, CA (US); Theodore Rees, Mountain View, CA (US); Bo Wei, Union City, CA (US)

(73) Assignee: Digital Papyrus Corporation, Sunnyvale, CA (US)

( * ) Notice: Subject to any disclaimer, the term of this patent is extended or adjusted under 35 U.S.C. 154(b) by 0 days.

(21) Appl. No.: 09/543,281

(22) Filed: Apr. 5, 2000

Related U.S. Application Data (60) Provisional application No. 60/127,816, filed on Apr. 5, 1999.

(51) Int. Cl.$^7$ ............................. B32B 3/02; G11B 7/24
(52) U.S. Cl. .................... 428/64.1; 428/64.4; 428/64.6; 428/64.9; 369/275.1
(58) Field of Search ............................. 428/64.1, 64.4, 428/64.6, 64.9; 369/275.1

(56) References Cited

U.S. PATENT DOCUMENTS

| | | | |
|---|---|---|---|
| 5,125,750 A | | 6/1992 | Corle et al. .................. 359/819 |
| 5,168,031 A | * | 12/1992 | Buckingham et al. ....... 430/270 |
| 5,497,359 A | | 3/1996 | Mamin et al. ............ 369/44.15 |
| 5,729,393 A | | 3/1998 | Lee et al. .................... 359/819 |
| 5,761,188 A | * | 6/1998 | Rosen et al. ............. 369/275.2 |

\* cited by examiner

*Primary Examiner*—Cynthia H. Kelly
*Assistant Examiner*—L. Ferguson
(74) *Attorney, Agent, or Firm*—Wolf, Greenfield & Sacks, P.C.

(57) ABSTRACT

An air-incident optical recording medium for use with flying heads has a system of layers, which thermally isolate the disk surface from the active, recording layer.

11 Claims, 6 Drawing Sheets

OPTICAL RECORDING MEDIA FOR AIR-INCIDENT OPTICAL RECORDING

CROSS-REFERENCE TO RELATED APPLICATIONS

This application claims the benefit, under 35 U.S.C. §119(e), of the filing date of U.S. provisional application Ser. No. 60/127,816, filed Apr. 5, 1999.

FIELD OF THE INVENTION

This invention relates to a multi-layer optical recording media having layer structures that reduce undesirable thermal effects. More particularly, the invention relates to such media designed for use in combination with a flying optical head.

RELATED ART

Optical storage techniques involving the use of flying optical heads have attracted much attention in the past few years. In flying head optical storage, a lens or system of lenses is supported by a slider body designed to "fly" over a rotating, optically sensitive disk. Since the lens or lenses can be flown very close to the optically sensitive layer, very high numerical aperture (NA) optics can be used to achieve high bit density.

Various patents to date have taught optical systems including solid immersion lenses and systems of lenses employing near-field effects carried on the body of a slider to achieve high linear density. For example, see Corle et al. (U.S. Pat. No. 5,125,750), Mamin et al. (U.S. Pat. No. 5,497,3 59), and Lee et al. (U.S. Pat. No. 5,729,393).

Figure 2:
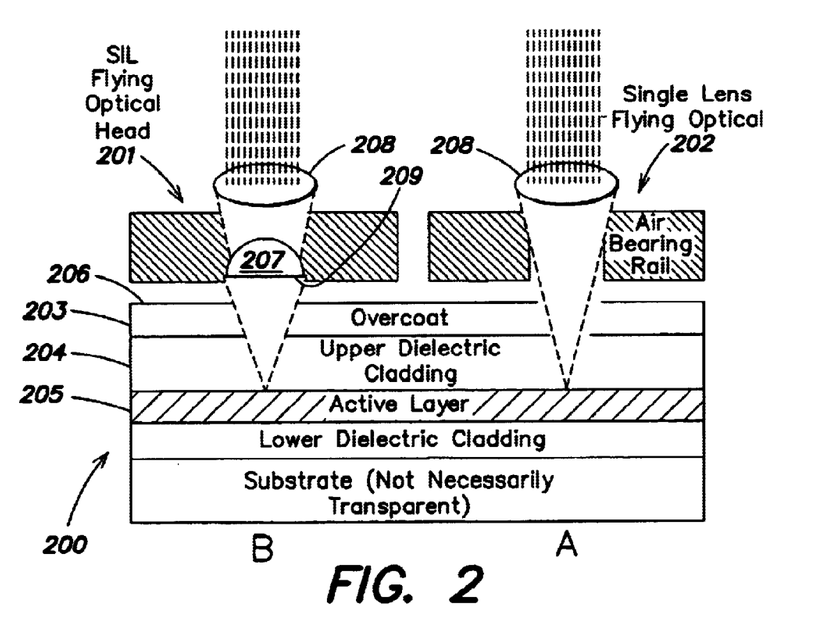
FIG. 2A is a schematic representation of a conventional air-incident optical recording medium and head.
FIG. 2B is a schematic representation of a conventional air-incident optical recording medium and head using a solid immersion lens (SIL) element.

Conventional flying optical heads, for example as disclosed in the above-mentioned patents, use specially designed "air-incident disks" that relocate the optically sensitive information-carrying layer from a on below a thick, transparent, protective substrate to a position very near the lowest face of the lens facing the disk (See FIG. 2). A hard coating is usually used as the top-most layer, between the information-carrying layer and the lens, to improve head-disk reliability. Appropriately chosen lubrication film and adhesion layers are also sometimes used.

Currently, the two most popular methods to create "marks" in the media rely on either a magneto-optical (MO) effect known as Kerr rotation or a phase-change (PC) between amorphous and polycrystalline phases of a metal alloy, the reflectivity of the two phases measurably differing. Recording systems using these media types elevate the active layer of each type of media to respective critical temperatures in order to execute the marking and erasing action. In the case of PC media, for example, the temperature at the active layer routinely exceeds 700° C. during amorphizing operation. Unlike conventional, substrate-incident optical recording where the active layer is separated from the lens by a thick plastic substrate, and the active layer to lens distance is measured in millimeters, in the case of air-incident media accessed by flying optical heads, this separation can be less than 1 micron. This is especially true when evanescent coupling is utilized to enhance the resolution, i.e., near-field recording. In the evanescent-enhanced case, the separation between the lowest facet of the lens element closest the disk and the top surface of the disk is only a few micro-inches.

One problem which has been observed in optical recording systems, such as described herein above, is that the surface of the lens closest the recording medium becomes contaminated with hitherto unknown contaminants which degrade the focussing capabilities of the system. Furthermore, if the optical drives are intended to support removable cartridges, the varied environment that the cartridges must operate in introduces additional surface species to the disk that can further affect the head-disk reliability.

SUMMARY OF THE INVENTION

The present invention overcomes some of the problems of conventional technology connected with the use of flying optical heads in close proximity to the recording layer.

According to one embodiment of the invention, there is an optical recording medium which can be used with a flying optical head, comprising: a protective overcoat layer; a first dielectric layer; a recording layer sensitive to modulation and readout by an optical beam; a second dielectric layer; and a metal reflector layer; wherein the layers are supported on a substrate for mechanical support; and where the said first dielectric layer and the protective overcoat layer have combined thermal properties that result in a surface temperature at the surface such that no significant physical evaporation of the protective overcoat layer or adsorbed molecules from an ambient atmosphere. In a drive environment that is not environmentally controlled, many air-born molecules exist and can adsorb on the surface of the disk to be re-evaporated later. In particular, water moisture exists in nearly all practical environments and can easily adsorb on the surface of the disk. It can be shown that water can cause significant degradation to the reliability of flying optical heads. In this embodiment, the structure keeps the surface temperature less than the surface desorption temperature of water during read and write operations. Alternatively, the structure keeps the surface temperature less than the desorption temperature of common hydrocarbon species found in ambient air during read and write operations. Desorption temperature of a compound adsorbed into a surface depends on the chemical nature of the compound and the surface into which the compound is adsorbed. The protective overcoat layer may comprise a solid-phase overcoat and a lubricant. Alternatively, the protective layer may itself be a lubricant. A third dielectric layer can be added between the metal reflector layer and the substrate. The recording layer can be a metal alloy comprising elements chosen from the group including: Ge, Sb, Te, In, Ag. Alternatively, the recording layer can be a magneto-optical material exhibiting Kerr effect. The protective overcoat layer can be designed to have low thermal conductivity to further isolate the heat generated by the making and erasing operations by an optical beam or can be designed to have high thermal conductivity to quickly dissipate the transmitted heat over a wide area. In variations of this embodiment, the separation between an upper surface of the recording layer and an upper surface of the overcoat layer can be in the range of 100–500 nm.

According to another embodiment of the invention, there is an optical disk designed to be used with flying optical heads, comprising: a protective overcoat layer; a first dielectric layer; a phase change recording layer where the reflectivity difference between the amorphous and crystalline states are utilized for mark formation; a second dielectric layer; and a metal reflector layer; wherein the layers are supported on a substrate for mechanical support; and when the phase change recording layer experiences a temperature sufficient to cause transformation to an amorphous state, a surface of the disk on which optical energy impinges experiences a temperature such that no significant evaporation of the protective overcoat layer and no significant evaporation of adsorbed molecules from ambient atmosphere occur. In this embodiment, the structure keeps the surface temperature less than the desorption temperature of water during read and write operations. The protective overcoat layer can be designed to have low thermal conductivity to further isolate the heat generated by the making and erasing operations by an optical beam or can be designed to have high thermal conductivity to quickly dissipate the transmitted heat over a wide area. Alternatively, the structure keeps the surface temperature less than the desorption temperature of common hydrocarbon species found in ambient air during read and write operations. The protective overcoat layer may comprise a solid-phase overcoat and a lubricant. Alternatively, the protective overcoat layer may itself be a lubricant. A third dielectric layer can be added between the metal reflector layer and the substrate. A thermal isolation layer having a thermal conductivity less than that of the first dielectric layer can be added between the protective overcoat and the first dielectric layer. In variations of this embodiment, the separation between the recording layer and the overcoat layer can be in the range of 100–500 nm. The total optical thickness between the recording layer and the surface of the disk can be greater than the optical thickness required to achieve the first maximum in reflectivity difference between the amorphous and the crystalline states of the phase change recording material.

It is also envisioned that one can also take advantage of the a prior knowledge of the kind of adsorbed molecules that is known to cause trouble to the optical system. For example, the overcoat material can be chosen such that it conforms to the requirements to contribute to a stable head-disk interface, but also to have a top surface facing the lens that is inhospitable to water (hydrophobic), which was mentioned earlier to be a known problem. The surface of the overcoat can be made hydrophobic by surface treatment or passivation. Similarly, if an lubricant is used, a lubricant that is hydro-phobic can be used. For other types of common air-born contaminants, a overcoat or lubricant with lower surface energy will minimize absorption and subsequent re-evaporation.

According to yet another embodiment of the invention, there may be an optical recording system comprising an air-incident optical disk compatible with flying optical heads, in which the recording layer is separated from a surface of the disk by intervening layers of a total thickness less than about 1 $\mu$m and a composition such that the highest temperature of the surface during normal operation is less than the desorption temperature of water; a flying optical head where the lowest facet of the lens element of the flying optical head is supported to float within a few microns or preferably less than 1 micron of the surface of the disk and where the optical focus of the flying head is at the recording layer; means of delivering a beam of light to the optical head; means of optically detecting and differentiating the presence and absence of the mark as seen by the optical beam; and tracking detection and feedback means to ensure that the optical beam can follow the path of the marks. In some variations on the system, the air-incident disk can use a phase change recording layer. The flying optical head can include a solid immersion lens element having a spherical surface and substantially flat surface facing the disk. The flying optical head can include a solid immersion lens or other structure to utilize evanescent coupling effects to decrease the spot size of the optical beam at the recording layer.

In an air-incident optical recording medium which can be used with a flying optical head, the recording medium including a recording layer sensitive to head produced by an optical beam, the invention can be embodied in a coating system less than 1 $\mu$m thick on the recording layer, the coating system having at least one layer whose thermal conductivity prevents a surface temperature from occurring when the recording layer is heated by the optical beam which can cause evaporation of molecules adsorbed therein from an ambient-atmosphere. The coating system can further have plural layers, wherein evaporation of an outmost layer is prevented by the thermal conductivity. In such a variation, the layers can include a dielectric overcoat layer; and a protective overcoat layer. The protective overcoat layer can include a lubricant. The protective overcoat can further include a solid overcoat.

BRIEF DESCRIPTION OF THE DRAWINGS

In the Figures, in which like reference designations indicate like elements.

DETAILED DESCRIPTION

Figure 1:
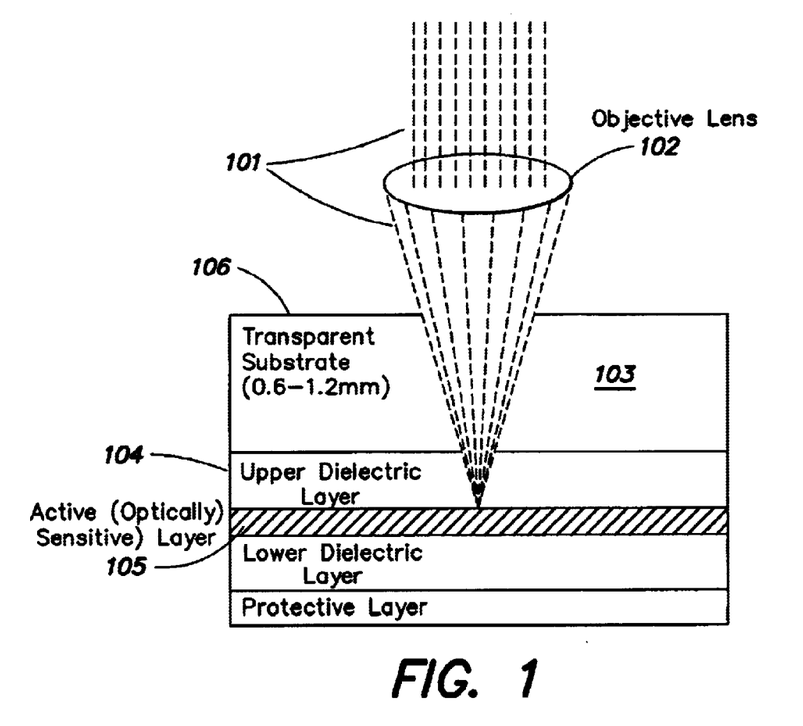
FIG. 1 is a schematic representation of a conventional substrate-incident optical recording medium and lens.

FIG. 1 schematically represents a conventional substrate-incident recordable optical disk. Light 101 is focused by the objective lens 102, through the transparent substrate 103 (which is typically 0.6 to 1.2 mm thick), through one or more dielectric cladding layers 104, and onto the optically sensitive active layer 105. The typical separation between the top 106 of the transparent substrate 103 and the objective lens 102 is 2–3 millimeters. The surface 106 of the substrate 103 where the light 101 enters and the lens element 102 are well insulated from any thermal event that occurs at the active layer 105.

In air-incident optical recording, the active layer is brought as close to the surface of the disk facing the lens as possible, with only a few, thin intervening layers to improve the head-disk interface and to satisfy optical requirements. FIGS. 2A and 2B schematically represent conventional air-incident disk structures 200 used with flying optical heads 201, 202. Both single-lens element flying heads 202 and SIL-type doublet supported by a slider body 201 are shown. Since the combined thickness of the overcoat 203 and the upper dielectric 204 is normally less than 1 micron, thermal events at the active layer 205 can strongly affect the surface 206 of the overcoat 203 and the lens 207, 208. This is especially true when SIL-type doublet is used, as the separation between the bottom facet 209 of the SIL lens 207 and the top 206 of the overcoat 203 is much less than 1 micron. Furthermore, a lubrication layer (not shown) is often used to improve head-disk reliability. Elevation of the surface temperature can have undesirable effects on the lubrication properties and causes evaporation of some lubricant.

Also, any airborne contaminant including moisture present in the ambient atmosphere, which may have been adsorbed into the surface of the disk, may be evaporated. These effects are described in further detail, now.

In the case of flying optical heads used with air-incident media, the surface temperature should be kept below some critical point, such critical point being determined by presence of the highest vapor pressure material that the disk and drive system is likely to encounter and cause undesirable effects. For example, in cases where a disk lubricant similar to those used in the magnetic hard drive industry is used, desorption of the lubricant material not only will reduce its effectiveness, but also has been observed to cause undesirable condensation of the lubricant species on the lens. Furthermore, common airborne contaminants, including volatile hydrocarbons and water for example, can also be adsorbed in the lubricant, or in the case when lubricant is not used, adsorbed in the overcoat, and be desorbed when the surface temperature is elevated. These desorbed species have also been observed to collect at the lens facet and cause undesirable modification to the light beam either in intensity, direction, or phase.

Therefore, embodiments of the present invention, when used with flying optical heads, are constructed and arranged to:

1. yield the necessary optical contrast to discern marks on the disk;
2. yield the necessary thermal characteristics for mark formation, for example, in the phase change system, the quenching rate;
3. yield sufficient optical efficiency to minimize power; and
4. yield a disk where the surface of the disk is below a present temperature at the highest power that is envisioned to be used in the drive environments.

Requirements 1–3 are individually well known in the art and are commonly practiced in the design of optical disks. However, no conventional designs to date have addressed all four of the above constraints on layer design and properties to specifically counter the deleterious effect of volatile compounds or moisture on the performance of lens systems.

The active layer temperature regularly exceeds 700° C. and 250° C. for the phase change (PC) and magneto-optical (MO) recording systems, respectively. However, comparable optical energies (about 8–10 mW) are typically delivered to the surface of the active layer in both systems to cause mark formation. The inventors have discovered a structure which addressed contamination of the lens by controlling the thermal effects which cause desorption of contaminants that subsequently would condense on the lens.

Using the phase change system as an example, which should not be considered limiting because a similar strategy can be applied to MO or other heat-activated recording systems, lens contamination can be controlled by thermally isolating the outermost surface from the active layer.

Figure 3:
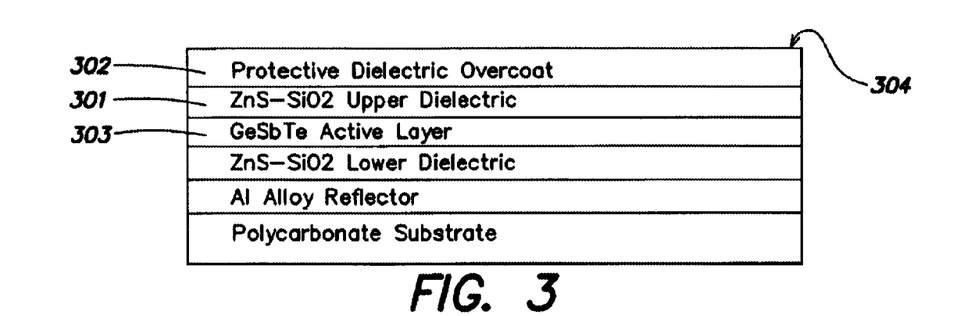
FIG. 3 is a schematic representation of a conventional air-incident phase change (PC) optical recording medium.
Figure 4:
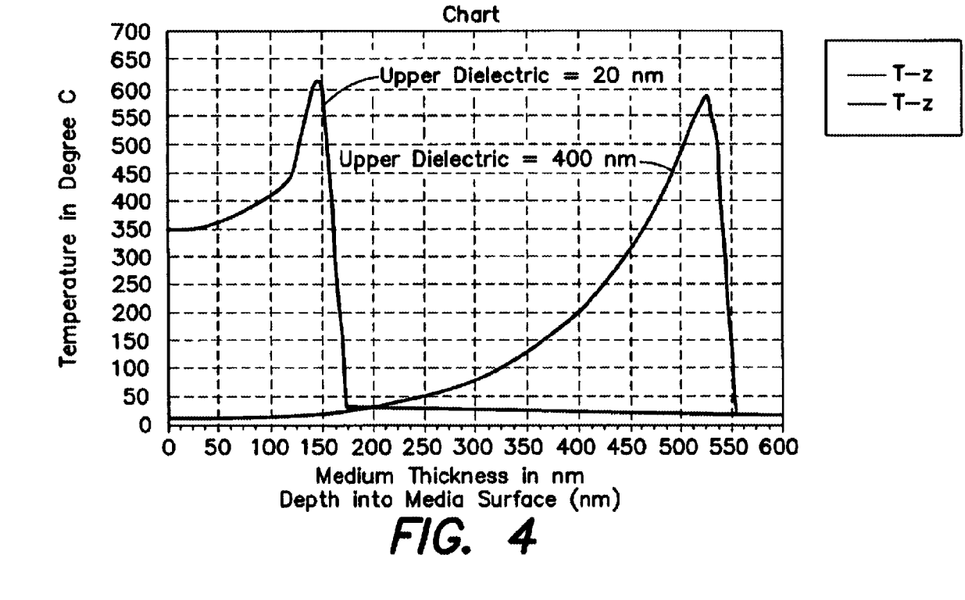
FIG. 4 is a graph comparing thermal performance of two different upper dielectric layer thickness.

In the structure shown schematically in FIG. 3, both the thickness and the thermal characteristics of the upper dielectric 301 and the overcoat 302 can serve to thermally isolate the active layer 303 from the surface 304. Although there is no theoretical limitation on how thick the combined layers can be, media sputter constraints, as well as optical tolerance constraints, limit the useful thickness to less than 200 nm of total thickness. Particularly, in high numerical aperture optical recording systems, high S/N requires very thin overcoat 302 on top of the recording layer 303, typically less than 100 nm. Thermal simulation results plotted in FIG. 4 show that with this kind of media, the surface temperature with a 20 nm upper dielectric 301 can reach or exceed 300° C. during prolonged writing and can lead to experimental observation of unstable tracking and data signals. The lack of stability in the optical signals have in turn been traced to the types of contamination condensing on the lens discussed above.

Embodiments of the invention address the above-mentioned problems associated with media for use with a flying optical head. Keeping the disk surface cool by providing additional heat sink material between the active layer and the supporting substrate can undesirably decrease the overall energy efficiency of the media, by requiring more input laser power due to the greater heat loss through the heat sink. This is particularly true for phase change type media, where cooling rates are critical for proper mark formation. However, thermal simulation shows that surface temperature can be effectively reduced by increasing one of the overcoat layers to 400 nm as shown in FIG. 4. It is also confirmed by optical simulation programs that as long as the overcoat is in a thickness range between a few nanometers and a few microns, optical performance of the head system remains good.

As can be expected, the thicker the combined thickness of upper dielectric and the overcoat, the better their thermal isolation properties. Since the overcoat layer's primary function is to produce a reliable head-disk interface, they may not necessarily have the desirable thermal isolation properties needed to ensure a low surface temperature. It is therefore advantageous to utilize the upper cladding layer, whose required material properties are to be low loss and compatible with the active layer, to perform the task of thermal isolation. In this manner, the overcoat species and thicknesses can be chosen purely for its head-disk interface contributions. However, one can also take advantage of the different material characteristics of the upper cladding versus the overcoat. For example, diamond-like carbon or other forms of carbon are widely used in magnetic disks as lubricants. Such layers typically have a high thermal conductivity. Although they will not contribute to thermal insulation, these layers can be used advantageously to dissipate the heat that is allowed to pass through the insulating upper cladding, leading to lower heat energy per unit area on the surface of the disk immediately underneath the lens.

Figure 5:
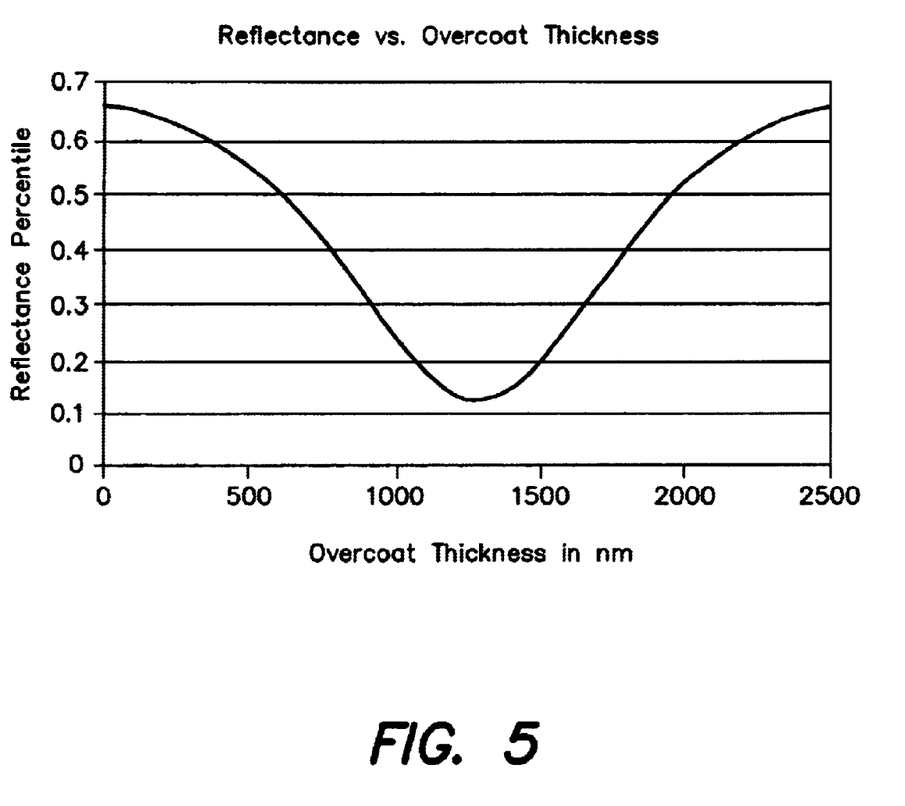
FIG. 5 is a graph of reflection v. protective overcoat layer thickness.
Figure 6A:
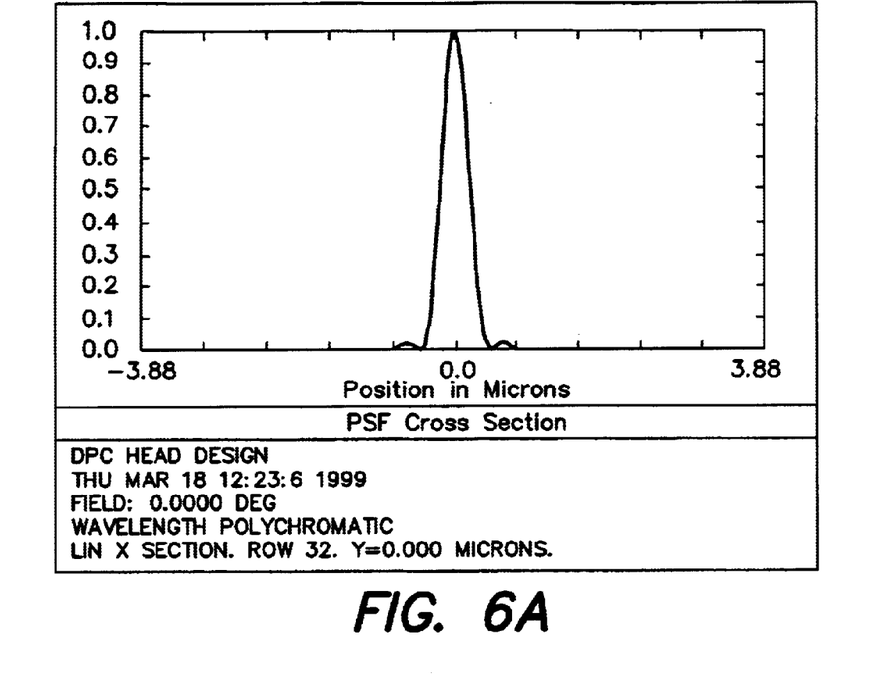
FIGS. 6A–6F are graphs of the point-spread function (PSF) and modulation transfer function (MTF) for media varying overcoat thickness.
Figure 6B:
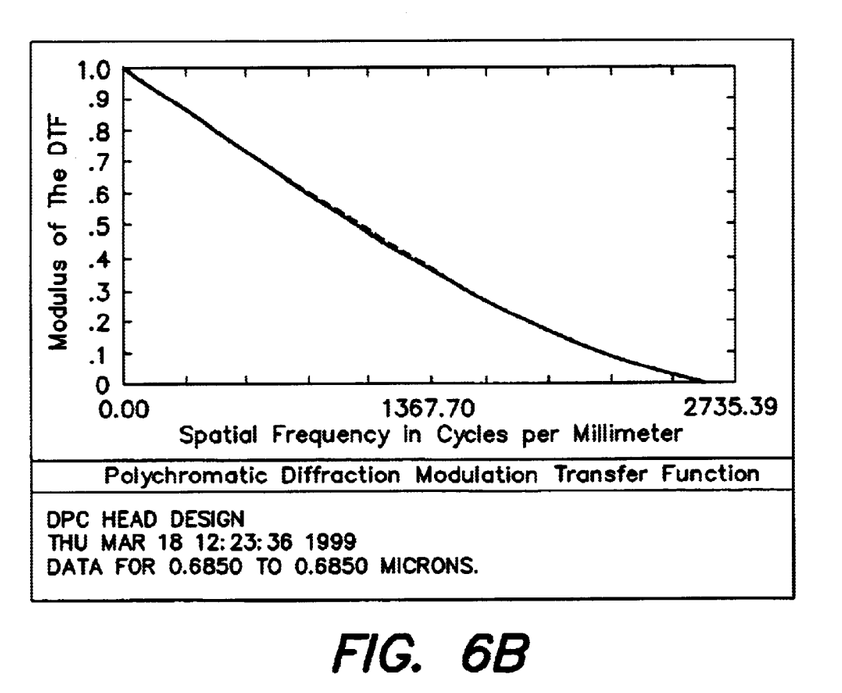
Figure 6C:
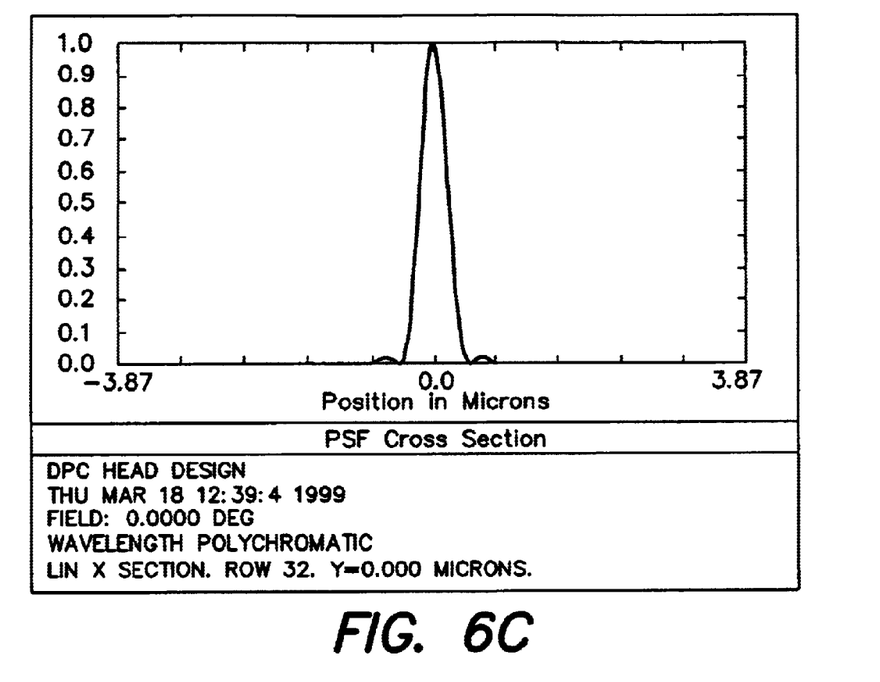
Figure 6D:
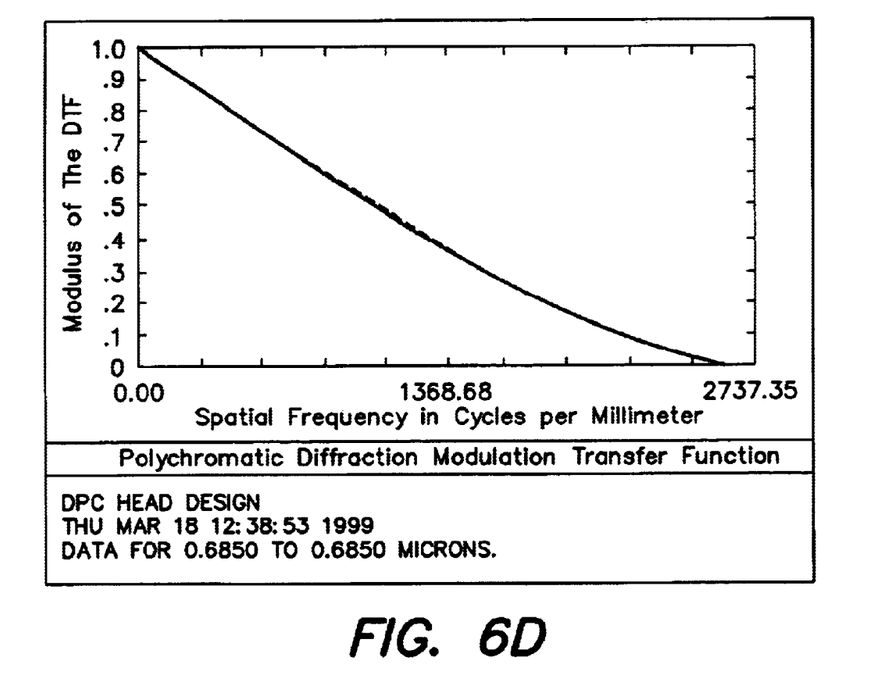
Figure 6E:
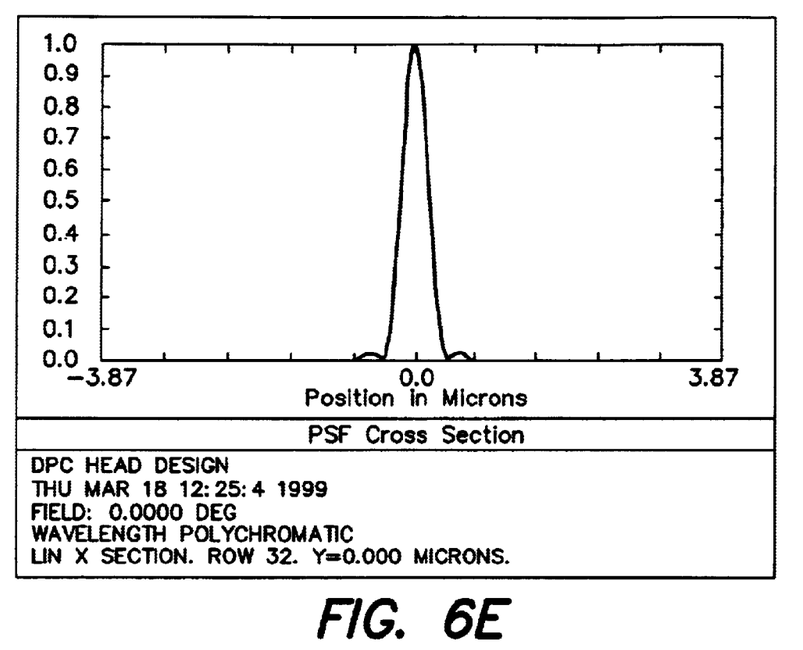
Figure 6F:
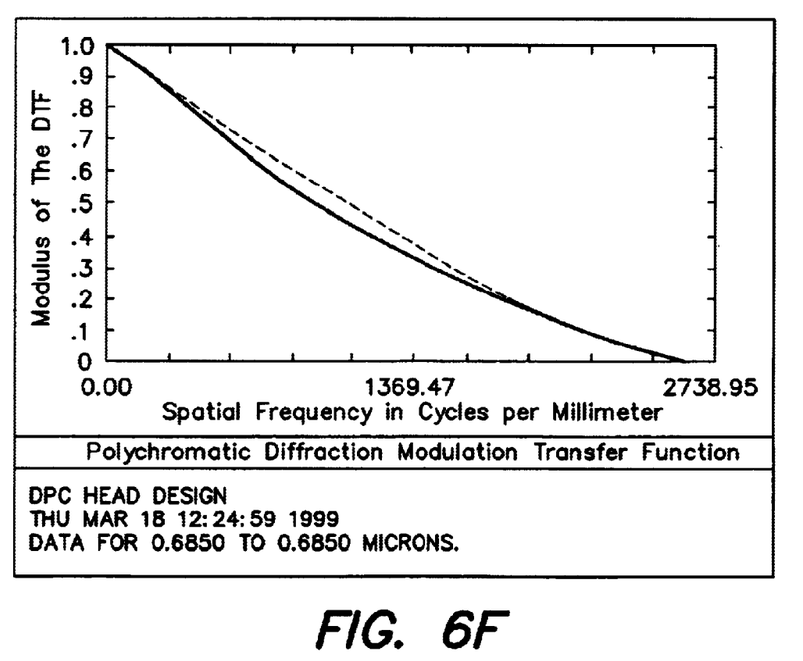

The total optical thickness of the upper cladding layer and protective overcoat is constrained by the need to maintain optical efficiency (reduce reflection) and contrast between states (as in the case of phase change media). FIG. 5 below shows a plot of a simulation of total reflectance versus overcoat thickness for a typical air-incident phase change disk suitable for flying. From FIG. 5, one can clearly see that when the thickness beyond 600–700 nm, the overall reflectance is much reduced, leading to insufficient light to produce reasonable S/N ratio. Furthermore, because of the high NA nature of the lens systems to achieve small spot size, the distance between the lower lens and the recording layer is constrained to be small. FIG. 6a through FIG. 6f illustrate the effect of the upper cladding layer thickness on the Point Spread Function (PSF) and Modulation Transfer Function (MTF) of a high NA optical system used to focus to the active layer. The MTF remains close to diffraction limit when the upper cladding layer thickness ranged from 0.12 to 1 $\mu$m. A demonstrable degradation can be seen when the thickness exceeds 1.0 $\mu$m for the specific layer structure used here. Such aberrant system will reduce overall system tolerance and increase difficulty in manufacturing.

Further constraints are placed on layer design by the necessity to maintain sufficient contrast between "states" of the media. For example, in the phase change case, the reflectivity difference between the amorphous and the crystalline states need to be maintained. Once materials are chosen for the upper dielectric and the protective overcoat, simultaneous satisfaction of all of the optical and thermal requirements mentioned above dictates the necessary thickness.

The present invention has now been illustrated in connection with the description of some embodiments thereof. Numerous modifications and variations now obvious to the skilled artisan are also contemplated by the inventors as within the scope and spirit of the invention. Therefore, the scope of the invention is not limited to the embodiments described, but only by the properly construed appended claims.

What is claimed is:

1. An optical recording system comprising:

an air-incident optical disk compatible with flying optical heads, in which a recording layer is separated from a surface of the disk by intervening layers of a total thickness less than about 1 $\mu$m and a composition such that the highest temperature of the surface during normal operation is less than the desorption temperature of water;

a flying optical head where the lowest facet of the lens element of the flying optical head is supported to float in close proximity to the surface of the disk and where the optical focus of the flying head is at the recording layer;

means of delivering a beam of light to the optical head so as to raise the recording layer to a temperature exceeding about 250° C.;

means of optically detecting and differentiating the presence and absence of the mark as seen by the optical beam; and tracking detection and feedback means to ensure that the optical beam can follow the path of the marks.

2. The system of claim 1 where the air-incident disk uses a phase change recording layer.

3. The system of claim 1 where the flying optical head comprises a solid immersion lens element having a spherical surface and substantially flat surface facing the disk.

4. The system of claim 1 wherein flying optical head utilizes evanescent coupling effects to decrease the spot size of the optical beam at the recording layer.

5. In an air-incident optical recording medium which can be used with a flying optical head, the recording medium including a recording layer sensitive to heat produced by an optical beam which raises the recording layer to a temperature exceeding 250° C., a coating system less than 1 $\mu$m thick on the recording layer, between the recording layer and the flying optical head, the coating system having at least one layer whose thermal conductivity prevents a surface temperature from occurring when the recording layer is heated by the optical beam which can cause evaporation of molecules adsorbed therein from an ambient atmosphere.

6. The coating system of claim 5, further comprising plural layers, wherein evaporation of an outermost layer is prevented by the thermal conductivity of the at least one layer.

7. The coating system of claim 6, wherein the coating system comprises:

a dielectric overcoat layer; and a protective overcoat layer.

8. The coating of claim 7, wherein the protective overcoat layer comprises a lubricant.

9. The coating of claim 8, wherein the protective overcoat further comprises a solid overcoat.

10. The coating of claim 7, wherein the dielectric overcoat layer is the at least one layer.

11. The coating of claim 10, wherein the protective overcoat layer has a thermal conductive causing rapid dissipation of surface heat.

* * * * *